(12) United States Patent
Fuchs

(10) Patent No.: US 8,960,687 B2
(45) Date of Patent: Feb. 24, 2015

(54) WORKHOLDER FOR HOLDING A WORKPIECE TO BE PROCESSED IN A MACHINE TOOL

(75) Inventor: Helmut Fuchs, Lohra-Rollshausen (DE)

(73) Assignee: Samson AG, Frankfurt am Main (DE)

(*) Notice: Subject to any disclaimer, the term of this patent is extended or adjusted under 35 U.S.C. 154(b) by 735 days.

(21) Appl. No.: 13/031,245

(22) Filed: Feb. 20, 2011

(65) Prior Publication Data

US 2011/0221144 A1 Sep. 15, 2011

(30) Foreign Application Priority Data

Feb. 26, 2010 (DE) .................. 10 2010 000 579

(51) Int. Cl.
*B23B 31/30* (2006.01)
*B23B 31/36* (2006.01)
*B23Q 3/18* (2006.01)

(52) U.S. Cl.
CPC . *B23B 31/36* (2013.01); *B23Q 3/18* (2013.01); *B23B 2270/025* (2013.01)
USPC .............................. 279/132; 279/4.11; 279/9.1

(58) Field of Classification Search
USPC .............. 279/132, 4.11, 9.1, 4.01, 4.03, 4.06, 279/4.1, 6, 143; 269/309, 310, 166
See application file for complete search history.

(56) References Cited

U.S. PATENT DOCUMENTS

| | | | | |
|---|---|---|---|---|
| RE24,842 E | * | 6/1960 | Gunther ........................ | 279/4.06 |
| 4,111,569 A | * | 9/1978 | Mengel .............................. | 403/5 |
| 4,624,184 A | * | 11/1986 | Katz et al. ...................... | 101/375 |
| 5,516,243 A | * | 5/1996 | Laube ........................ | 408/239 R |
| 6,015,154 A | * | 1/2000 | Andre et al. .................. | 279/2.07 |
| 2011/0200386 A1 | * | 8/2011 | Kimman et al. .............. | 403/373 |

FOREIGN PATENT DOCUMENTS

| | | |
|---|---|---|
| DE | 40 00 025 C2 | 7/1994 |
| DE | 196 11 709 C2 | 7/1998 |
| DE | 42 18 466 C2 | 7/1999 |
| DE | 20 2004 015 097 U1 | 10/2005 |
| JP | 201136930 | 2/2011 |

OTHER PUBLICATIONS

Japan Patent Office, Notification of Reason for Refusal, Office Action, Nov. 5, 2013, Japanese Patent Application No. 2011-039569, p. 1-3, Japan.
German Patent and Trademark Office, Examination Report, May 29, 2013, p. 1-17, Munich, Germany, Application No. 102010000579.7, Applicant: Samson AG ; English Translation, p. 1-2 Submitted Therewith.
English Translation of Notification for Reason for Refusal, Japan Patent Office, Office Action, Jun. 24, 2014, p. 1-3, Japanese Patent No. 2011-039569, Japan.
Notification of Reason for Refusal, Japan Patent Office, Office Action, Jun. 24, 2014, p. 1-3, Japanese Patent No. 2011-039569.

* cited by examiner

*Primary Examiner* — Andrea Wellington
*Assistant Examiner* — Chwen-Wei Su
(74) *Attorney, Agent, or Firm* — Woodling, Krost and Rust

(57) ABSTRACT

The invention relates to a workholder (10) for holding a workpiece to be processed in a machine tool, which workholder (10) is in the form of a annular body (12) having a central through hole (14), said annular body (12) having at least one weakened area (18, 20; 34, 36, 38, 40; 50, 52, 54, 56) obtained by material removal, as well as at least one pressure chamber (22; 42, 44; 58, 60) assigned to said at least one weakened area (18, 20; 34, 36, 38, 40; 50, 52, 54, 56) that can be charged with a pressurized fluid. Said at least one weakened area (18, 20; 34, 36, 38, 40; 50, 52, 54, 56) is dimensioned and arranged so as to cause said annular body (12) to be elastically deformable in an axial and/or a radial direction (a, r). As a result, with pressure acting on said pressure chamber (22; 42, 44; 58, 60), said annular body (12) can then be deformed elastically in a well-defined manner in an axial and/or a radial direction (a, r).

7 Claims, 10 Drawing Sheets

WORKHOLDER FOR HOLDING A WORKPIECE TO BE PROCESSED IN A MACHINE TOOL

The present invention relates to a workholder for holding a workpiece to be processed in a machine tool.

It has been known from the prior art to finely adjust tools such as drills, milling cutters or cutting chisels by means of so called tool correction systems so as to compensate for processing tolerances, tool wear or also temperature influences. Prior art tool correction systems allow tools to be tilted with respect to the axis of rotation, for example, or to be finely adjusted in a different manner, all with micrometer precision. Concerning the prior art of such tool correction systems for finely adjusting a tool, reference is made to DE 40 00 025 C2, DE 42 18 466 C2 and DE 196 11 708 C2. The prior art tool correction systems, however, merely allow an adjustment of the tool itself. This means that with these prior art tool correction systems, an adjustment of the workpiece in the micrometer range for compensating for manufacturing tolerances and tool wear or for temperature-related fluctuations is not possible.

Moreover, novel concepts concerning manufacturing modules are nowadays used for machining workpieces in several steps, as is disclosed for example in DE 20 2004 015 097 U1. These novel machine tools include a plurality of stationary and differently positioned elements such as the spindle and other tools that are mounted on a U-shaped frame for example. They furthermore include a workpiece carrier which can be moved on multiple axes and can thus carry the workpiece from the one tool to the next. In this novel concept of manufacturing modules, it is the workpiece or the workpiece carrier or the workholder which is now moved rather than the tools, which remain stationary. Such manufacturing modules would have to use a vast number of prior art tool correction systems corresponding to the number of tools present. This is disadvantageous both with regard to costs and to the installation space available. It is the object of the invention to provide a workholder for holding a workpiece to be processed in a machine tool which can be used for an extremely fine correction of the workpiece position in the micrometer range so as to allow processing tolerances such as manufacturing tolerances, wear and temperature-related fluctuations to be corrected or compensated.

According to the invention, the workholder for holding a workpiece to be processed in a machine tool is provided in the form of an annular body with a central through hole. Said annular body has at least one weakened area obtained by material removal, and at least one pressure chamber assigned to said weakened area and which can be pressurized by means of a pressurized fluid. Said at least one weakened area is dimensioned and arranged so as to allow an elastic deformation of said annular body in an axial and/or a radial direction. "Pressure chamber assigned to the weakened area" means that the pressure chamber is disposed with respect to the weakened area in such a way that pressurization of the pressure chamber will result in said annular body becoming specifically elastically deformable in an axial and/or a radial direction. This means that the annular body holding the workpiece has defined weakened areas which ultimately act like a spring, thus lending the basically rigid annular body a certain amount of elasticity. By exploiting the special positioning and arrangement of the weakened and rigid areas of the annular body, one can thus set precisely predetermined positioning directions of the annular body in which the annular body—and thus the workpiece held in it—will then elastically move upon pressurization.

The workholder according to the present invention is the first of its kind to allow an adjustment of the workpiece position along one axis in an axial direction, or along two axes in an axial and a radial direction, or even along three axes in one axial direction and two perpendicular radial directions, depending on the arrangement and shape of the weakened areas and the assigned pressure chamber(s). It is also possible to allow for a tilting or pivoting of the annular body by making the weakened areas asymmetrical.

Consequently, the workholder according to the invention advantageously allows compensation for blade wear, tool pre-setting tolerances, cutting insert tolerances, temperature variations and height offset in the workholder. This means that the workholder of the present invention will ensure the required compensation of disturbances during machining in order to safeguard dimensional accuracy in automated production.

Another advantage of the workholder according to the invention is that down and changeover times of the processing machine can be shortened and manufacturing costs can be reduced, at the same time maintaining the optimum manufacturing quality level. The workholder of the invention is preferably used in series production where a precise fine adjustment in the micrometer range is required.

For the sake of completeness only, it is to be pointed out here that said at least one or plural weakened area(s) is/are to be dimensioned such that said annular body will be sufficiently rigid to be capable of locating and positioning the workpiece in a defined and precise manner during machining. This means that said at least one or several weakened area(s) of said annular body is/are to be dimensioned such that they will by no means result in a deformation of the annular body when acted upon by forces occurring during the normal machining of the workpiece by the tools. On the other hand, however, this means that the forces with which the annular body is to be elastically deformed in a defined manner in order to compensate for manufacturing tolerances need to be stronger, in particular considerably stronger, than the forces acting on it during the machining of the workpiece. This explains why the hydraulic control pressure to be accommodated in order to achieve a defined specific fine adjustment of the annular body or the workholder may well reach values of between 100 and 300 bar.

As already set out above, the annular body has a through hole for mounting the workpieces or for accommodating a tool clamping system therein. For this purpose, a sleeve is preferably provided within said central through hole which sleeve is detachably mounted on the annular body by means of fastening means. A tightening bolt may be passed through said sleeve for attaching said workpiece to said workholder. Moreover, a workpiece clamping system may be float-mounted on said annular body.

In accordance with a first embodiment of the invention, said annular body comprises two weakened areas in its outer peripheral surface, that is a first recess and a second recess which is axially spaced from said first recess. These two recesses run all around said annular body in the manner of rings, at the same time extending radially toward its interior like recesses. Assigned to these two recess-like recesses is a pressure chamber which is disposed—as viewed in an axial direction—between said first and said second recess-like recesses. Like the first and said second recesses, the pressure chamber, too, constitutes a recess-like recess that extends all around said body like a ring. However, in contrast to said first and said second recesses, said pressure chamber, or third recess, extends radially toward the exterior like a recess, in relation to the through hole. Moreover, said pressure chamber or third recess is sealed fluid-tight toward said through hole. As a result of the specific location and design of the weakened areas and of the assigned pressure chamber, the annular body will exclusively expand in an axial direction when pressurized fluid acts on the pressure chamber. This means that the workholder of the first embodiment allows a workpiece connected to said annular body to be finely adjusted in an axial direction.

Said first and second recesses preferably differ in depth in a radial direction. This advantageously ensures higher elasticity, thus preventing extreme stress peaks in the annular body of the workholder.

Advantageously, the third recess is sealed in a fluid tight manner toward the through hole by means of a filling element. The fluid tight sealing of the third recess by means of a filling element proves advantageous in that it constitutes a simple means of reducing the size of the pressure chamber and thus the amount of fluid necessary.

In a second embodiment of the invention, the annular body comprises four weakened areas, i.e. two diametrically opposed rectangular recesses in its outer peripheral surface, and two double-S-shaped incisions penetrating said annular body and extending in a circumferential direction thereof. The two rectangular recesses and the two double-S-shaped incisions are arranged such that—as viewed in an axial direction the incisions are disposed at the level of the rectangular recesses, and in a circumferential direction—a double-S-shaped incision is located between each of the two diametrically opposed rectangular recesses. A pressure chamber is assigned to each of the two rectangular recesses. As viewed in a radial direction, the pressure chambers are provided in the form of recesses located between the respective rectangular recess and the central through hole. Contained in each of the two pressure chambers in the form of recesses is a piston which can be displaced in a radial direction and acted upon by pressurized fluid. Here, the well-defined weakened areas in the form of the two diametrically opposed rectangular recesses in combination with the two double-S-shaped incisions again form a kind of spring, which lends the actually rigid annular body a certain degree of elasticity in a radial direction. Consequently, when pressurized fluid acts on the two pistons, said annular body will specifically deform radially in the direction of the surface normal of the rectangular recesses. The workholder of the second embodiment of the invention thus allows a specific fine adjustment of the annular body, and thus of a workpiece held on said annular body, in a radial direction.

Of course, it would also be conceivable to combine the first and second embodiments described above. The annular body would then have an annular body portion formed as in the first embodiment and—spaced axially therefrom—an annular body portion formed as in the second embodiment. Consequently, the resulting annular body will allow a specific fine adjustment of the workpiece both in an axial and a radial direction.

In a third embodiment of the invention, the annular body has—beside the four weakened areas already described in the second embodiment and the two assigned pressure chambers—four additional weakened areas as well as two additional pressure chambers. These four additional weakened areas and the two additional pressure chambers are identical in design to the ones described above in the second embodiment, but axially spaced from, and rotated by 90° with respect to them. Since the first four weakened areas as well as the additional four weakened areas offset by 90° therefrom each in turn act like a spring, the annular body has a certain degree of elasticity in two perpendicular radial directions. This means that once a certain pressure acts on the pistons, said annular body can be elastically deformed in two radial directions that are perpendicular to each other, which thus allows a specific fine adjustment of the workpiece held by the annular body in two radial directions that are perpendicular to each other.

For the sake of completeness only, it is to be pointed out that in the second and third embodiments of the invention described above, the term "weakened area" refers both to the diametrically opposed rectangular recesses as well as to the double-S-shaped incisions made in the annular body e.g. by means of wire cut EDM, and that the spring effect described above is a result of the combination of these special weakened areas.

Also the third embodiment can of course be combined with the first embodiment, meaning that the resulting annular body will have an annular body portion formed as in the first embodiment and—axially spaced therefrom—an annular body portion formed as in the third embodiment. Consequently, the annular body will allow a specific fine adjustment of the workpiece both in an axial direction and in two radial directions that are perpendicular to each other.

It is also conceivable to provide the weakened areas in an asymmetrical form. If the weakened areas are formed asymmetrically, this will allow the workholder to be deflected about a tilting or swivel axis which is disposed symmetrically and also asymmetrically to the longitudinal axis of said annular body.

Further advantages, features and possible applications of the present invention may be gathered from the description which follows, in connection with the embodiments illustrated in the drawings.

The invention will now be described in more detail with reference to the embodiments illustrated in the drawings.

The terms and associated reference numerals used throughout the description, the claims and the drawings are as specified in the list of reference numerals below. Of the drawings, FIG. 1 is a sectional view of a first embodiment of a workholder according to the present invention which can be finely adjusted in an axial direction;

In order to avoid unnecessary repetitions, all identical parts and components shall bear the same reference numerals throughout the following description and the drawings, unless further differentiation is necessary or reasonable.

Figure 1:
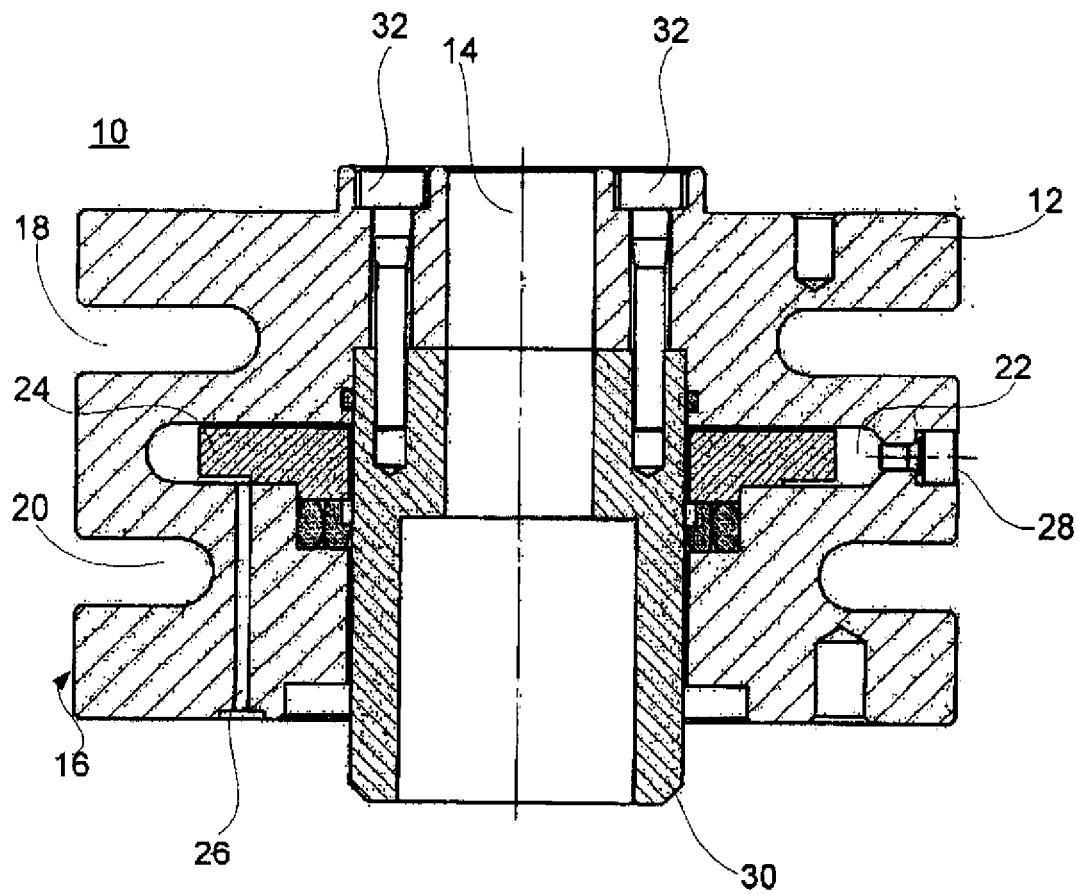

FIG. 1 is a more or less schematic sectional view of a first embodiment of a workholder 10 according to the present invention which can be finely adjusted in an axial direction a. The workholder 10 takes the form of an annular body 12 and has a central through hole 14.

In its peripheral surface 16, said annular body 12 has two weakened areas 18, 20. These two weakened areas are spaced from each other in an axial direction a and formed as recesses 18, 20 that run all around the annular body like rings and extend radially towards the interior like recesses. The first recess 18—i.e. the top recess, as viewed in an axial direction a—is greater in depth, as viewed in a radial direction r, than the second recess 20, i.e. the bottom one.

Furthermore, a pressure chamber is provided between the first recess 18 and the second recess 20. This pressure chamber—as viewed from the direction of the through hole 14—takes the form of a third recess 22 that runs all around the annular body like a ring and extends radially towards the exterior like a recess.

In order to reduce the required amount of pressurized fluid as well as for fluid-tight sealing the third recess 22 or pressure chamber 22 with respect to the central through hole 14, a filling element 24 is contained in said third recess 22. As may further be noted from FIG. 1, due to the presence of the filling element 24, the actual pressure chamber 22 only takes up a narrow area which extends from above the ground of the recess of the second recess 20 to about the centre of the ring of the first recess 18.

Moreover, said annular body 12 has a pressurized fluid channel 26 which is actively connected to said pressure chamber 22, as well as an air vent screw 28 which is actively connected to said pressure chamber.

Furthermore, a sleeve 30 is mounted within the central through hole 14 of said annular body 12 by means of screws 32, and a bolt may for example be passed through said sleeve 30 in order to attach a workpiece to said workholder 10.

Due to the specific positions and designs of the first and second recesses 18, 20, these act like a spring, thus lending the actually rigid annular body 12 a certain elasticity in an axial direction a. When pressurized fluid is supplied to the pressure chamber 22 via the pressurized fluid channel 26, this will cause the annular body 12 to expand in a predetermined manner in an axial direction a. As a result, a workpiece (not shown here for clarity reasons) which is connected to said workholder 10 will also be finely adjusted in an axial direction a.

A second embodiment of a workholder 10 according to the present invention is more or less schematically illustrated in FIG. 2 to 5.

Figure 2:
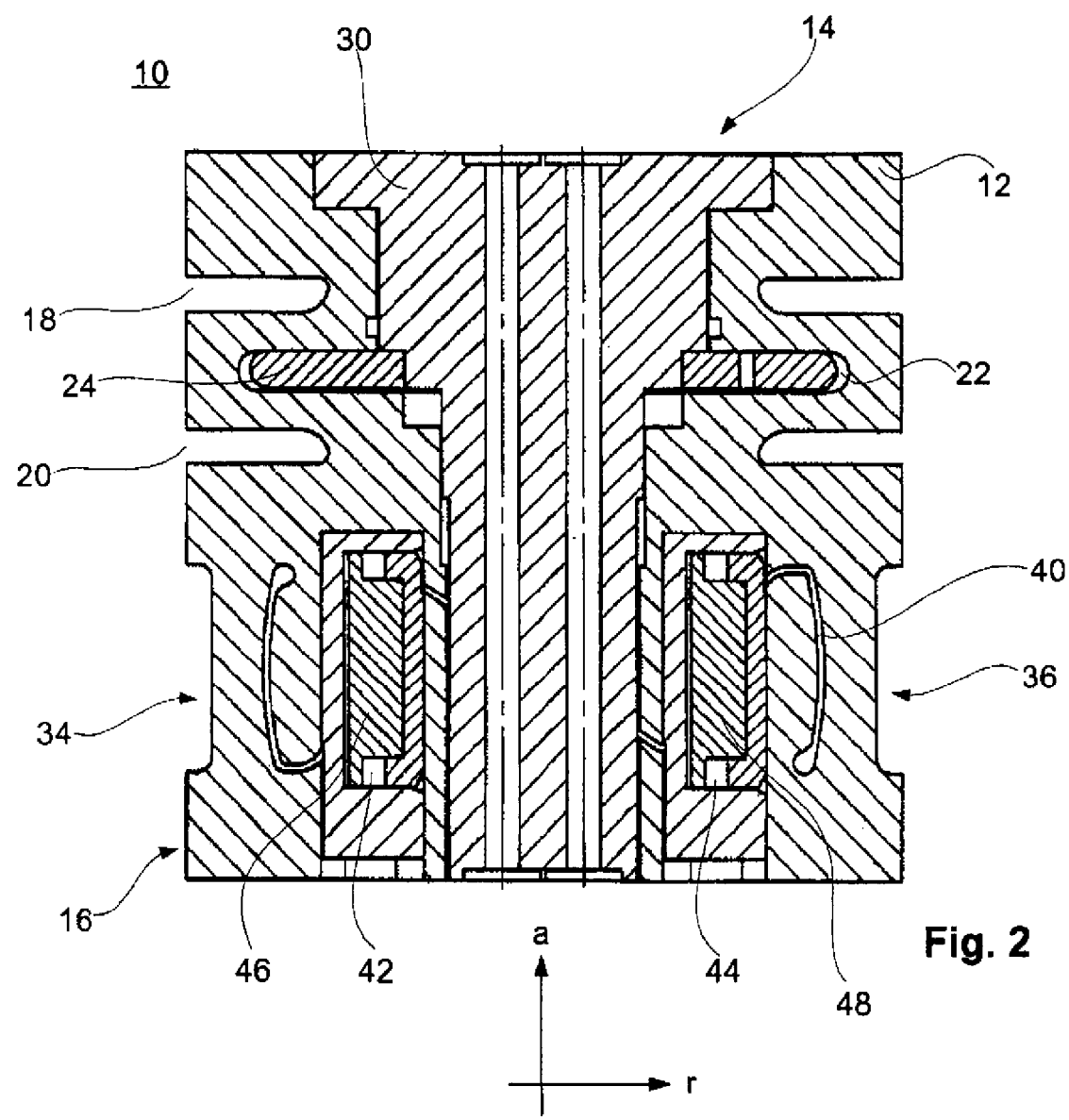
FIG. 2 is a sectional view of a second embodiment of a workholder according to the present invention which can be finely adjusted both in an axial direction and in a radial direction.

As in the first embodiment, the workholder of the second embodiment is in the form of an annular body 12 having a central through hole 14 extending through it, see FIG. 2.

Figure 3:
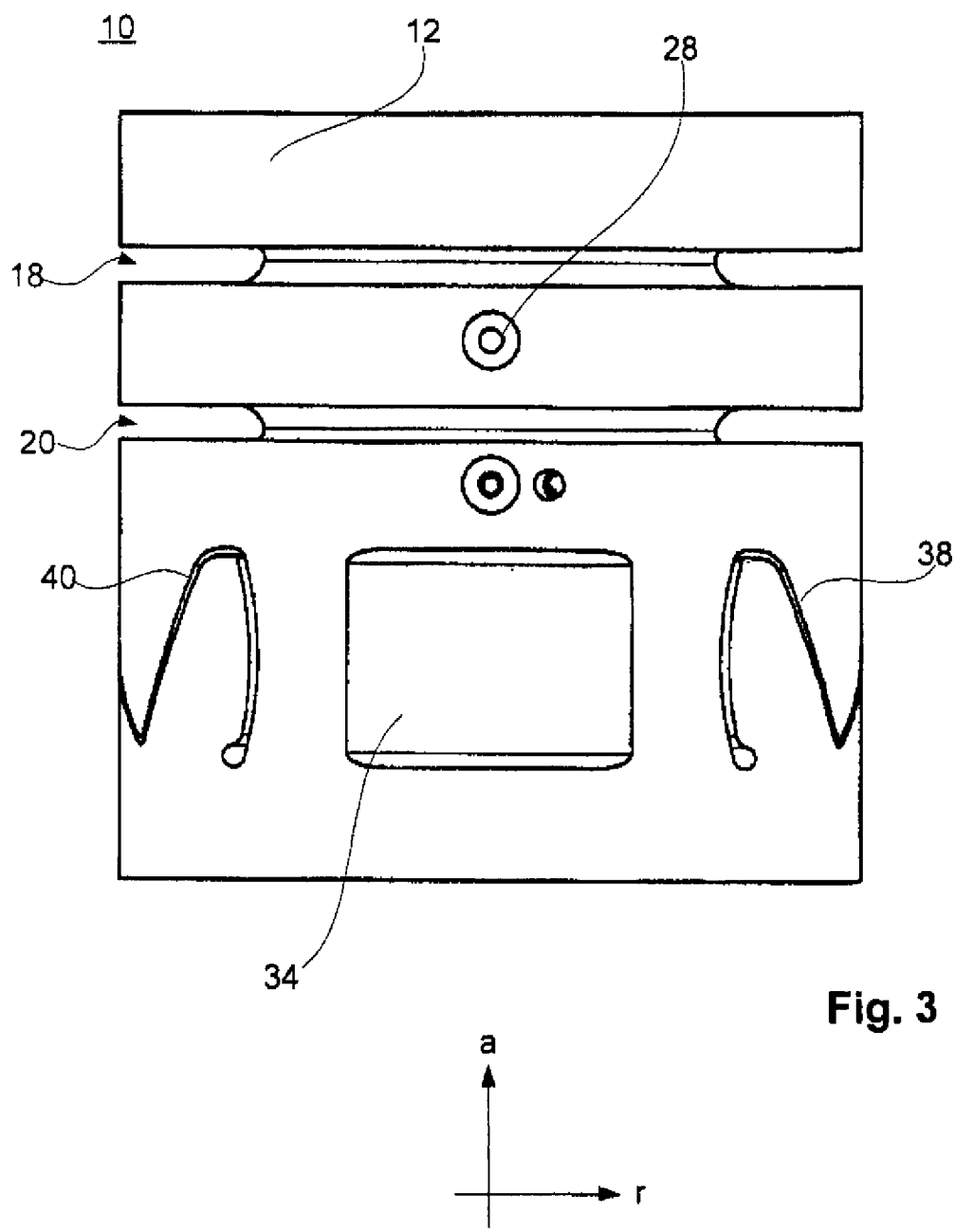
FIG. 3 is a lateral view of the workholder of FIG. 2.
Figure 4:
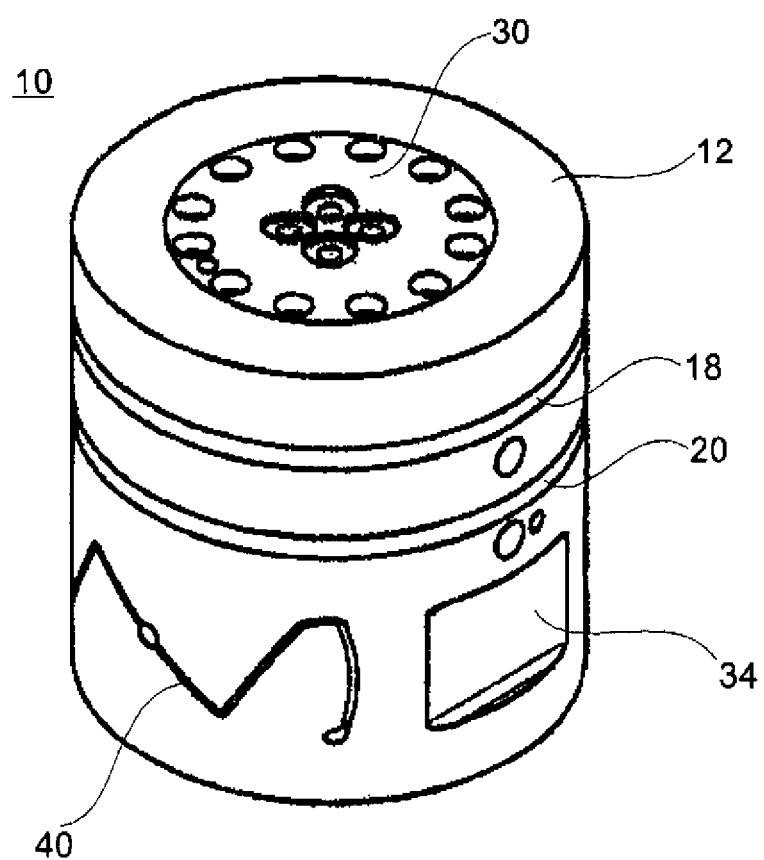
FIG. 4 is an angular top view of the work holder of FIG. 3.
Figure 5:
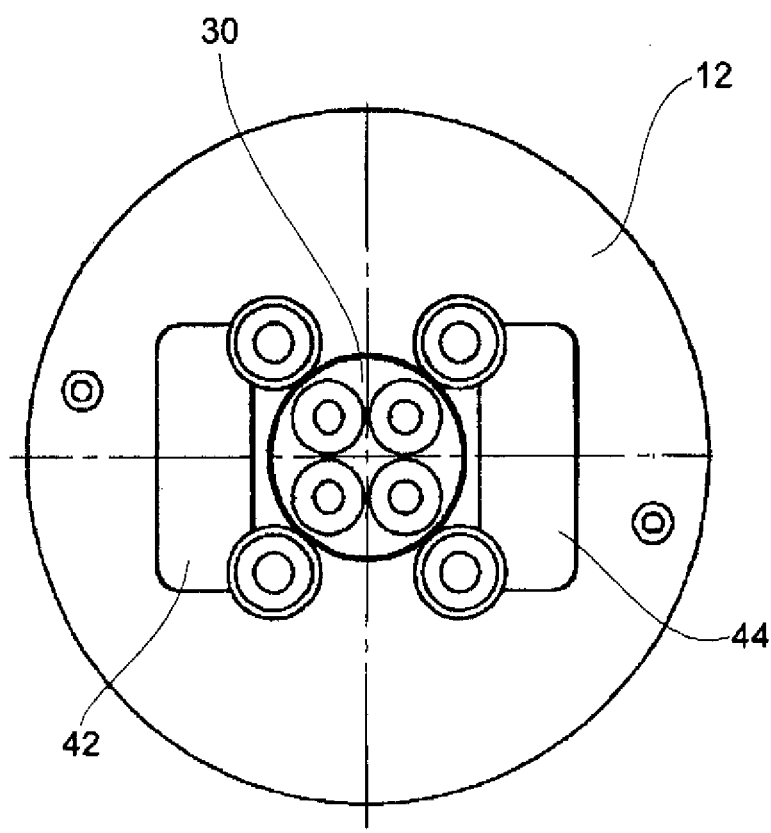
FIG. 5 is a bottom plan view of the workholder of FIG. 4.

As may further be seen from FIG. 2 and especially also FIG. 3, the annular body 12, as viewed in an axial direction a, may be subdivided into two portions, i.e. a top portion which is formed in accordance with the first embodiment and thus allows an axial adjustment of the annular body 12 in the manner already described above, and a bottom portion whose function will now be explained below.

The bottom portion of said annular body 12, as viewed in an axial direction a, has a total of four weakened areas, i.e. in its outer peripheral surface 16 two diametrically opposed rectangular recesses 34, 36 (see FIG. 2, as well as FIG. 3 and FIG. 4) as well as two double-S-shaped incisions 38, 40 which penetrate said annular body 12 and extend in a peripheral direction. The two diametrically opposed rectangular recesses 34, 36 and the two double-S-shaped incisions 38, 40 are disposed such that—as viewed in an axial direction a—the incisions 38, 40 are located approximately at the level of the rectangular recesses 34, 36 and a double-S-shaped incision 38, 40 each extends in a peripheral direction between the two rectangular recesses 34, 36. The double-S-shaped incisions 38, 40 are for example made in the annular body 12 by means of wire cut EDM. The two rectangular recesses 34, 36, in combination with the two double-S-shaped incisions 38, 40, constitute a kind of spring which makes the actually rigid bottom portion of the annular body 12 more elastic in a radial direction r. The radial positioning direction is in the direction of the surface normal of the opposed rectangular recesses 34, 36.

As may further be noted from FIG. 2, a pressure chamber each is assigned to both the rectangular recess 34 and the rectangular recess 36. The two pressure chambers—as viewed in a radial direction r—are each formed as recesses 42, 44 disposed between the rectangular recesses 34, 36 and the through hole 14. Mounted within said two recesses 42, 44, or the pressure chambers 42, 44 formed by the recesses, is a piston 46, 48 each which can be displaced in a radial direction r by pressurized fluid acting on it.

When pressurized fluid acts on said two pistons 46, 48, thus causing them to move in a radial direction r, the annular body 12 will expand radially in a specific manner. As a result, a workpiece (not shown here for clarity reasons) which is connected to said workholder 10 will likewise be finely adjusted in a radial direction r.

Since—as already mentioned above—the top portion of the annular body 12 has been formed according to the first embodiment, the workholder of the second embodiment allows an adjustment of the workpiece both in an axial direction a (top portion of said annular body) and an adjustment of said workpiece in a radial direction r (bottom portion of said annular body). Here, too, a sleeve 30 is mounted within said through hole 14, said sleeve 30 containing channels for mounting the workpiece therein or for passing air and energy therethrough.

A third embodiment of the workholder according to the invention is shown in FIGS. 6 to 9.

Figure 7:
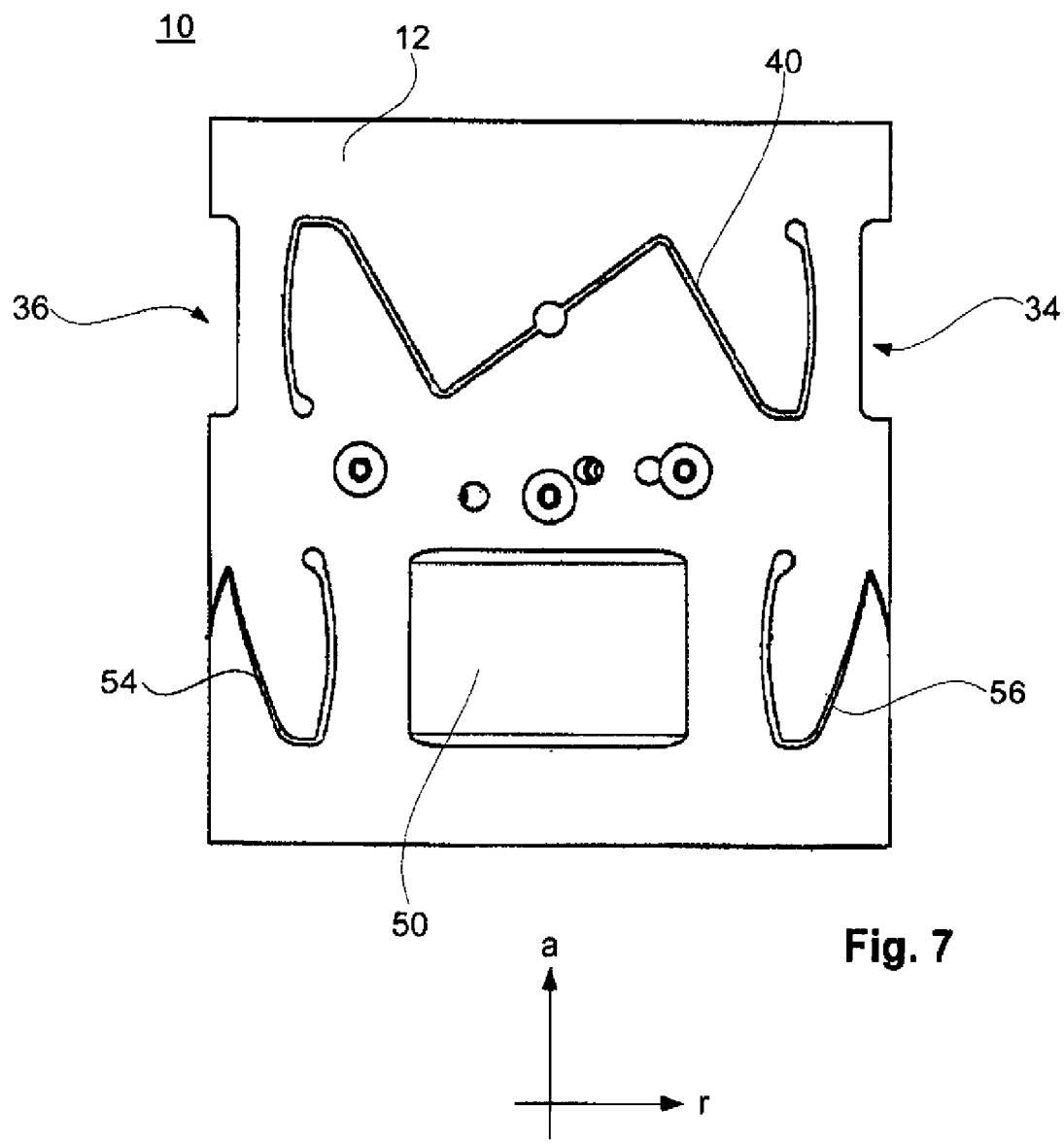
FIG. 7 is a lateral view of the workholder of FIG. 6.
Figure 8:
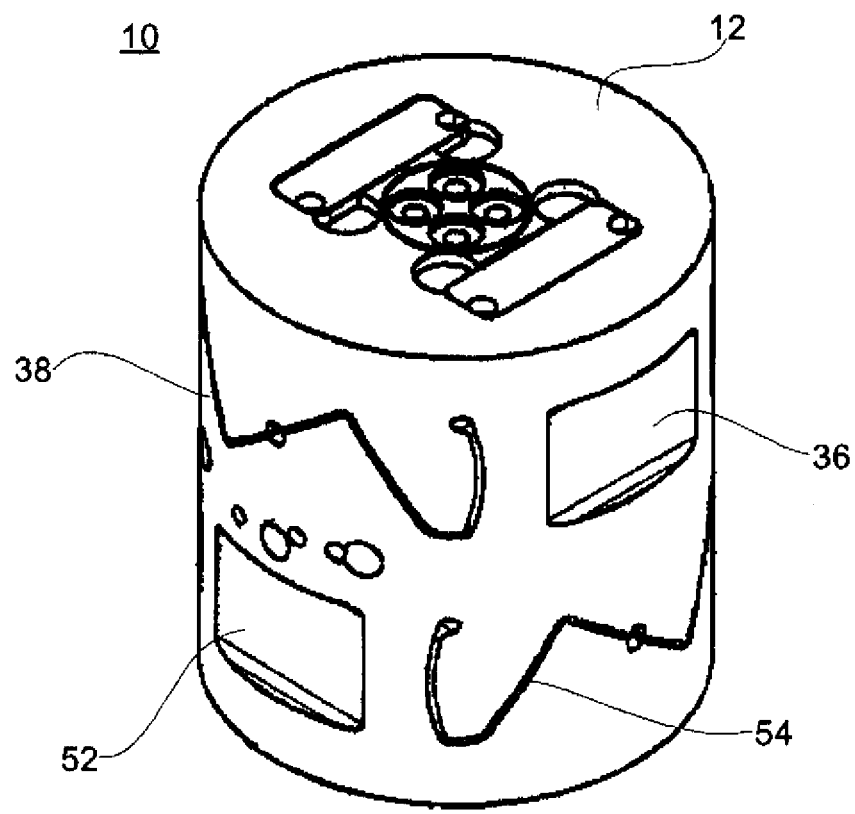
FIG. 8 is an angular top view of the workholder of FIG. 7.
Figure 9:
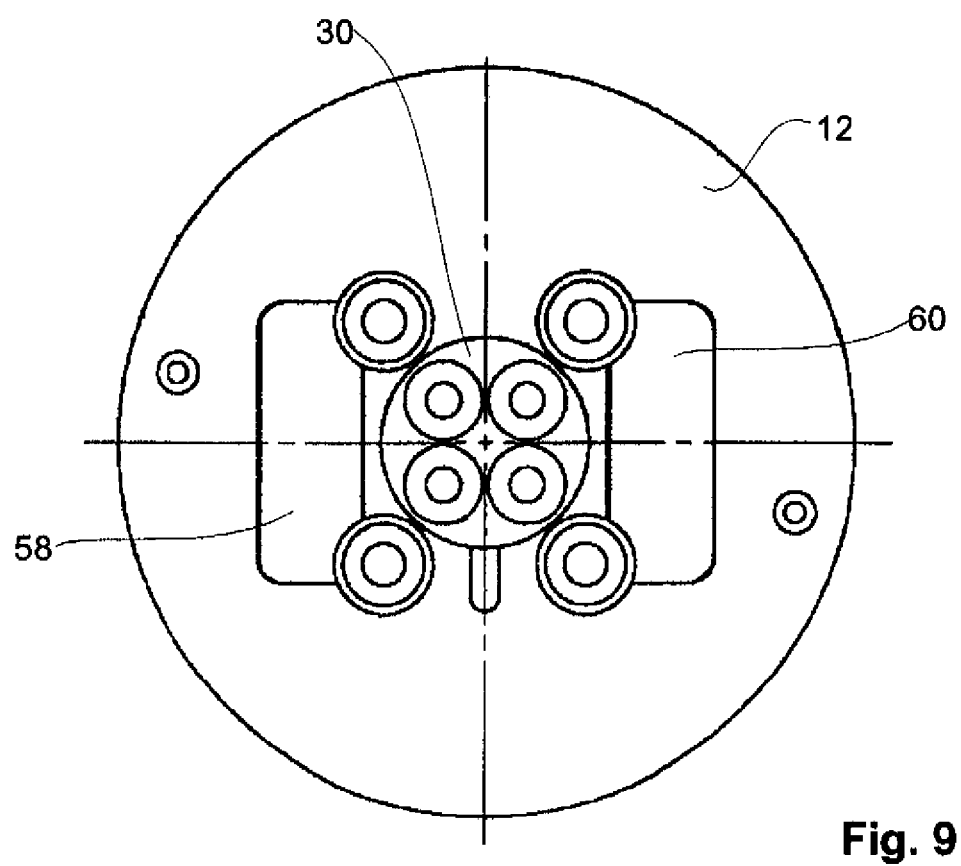
FIG. 9 is a bottom plan view of the workholder of FIG. 8.

As can be seen in FIG. 7 and FIG. 8, the annular body 12—as viewed in an axial direction a—may again be subdivided into a bottom portion and a top portion The top portion of the annular body 12, having the rectangular recesses 34, 36 and the two double-S-shaped incisions 38, 40, is thus essentially identical in design to the bottom portion of the annular body 12 of the second embodiment and thus allows the adjustment of the annular body in a radial direction, as already explained above.

Figure 6:
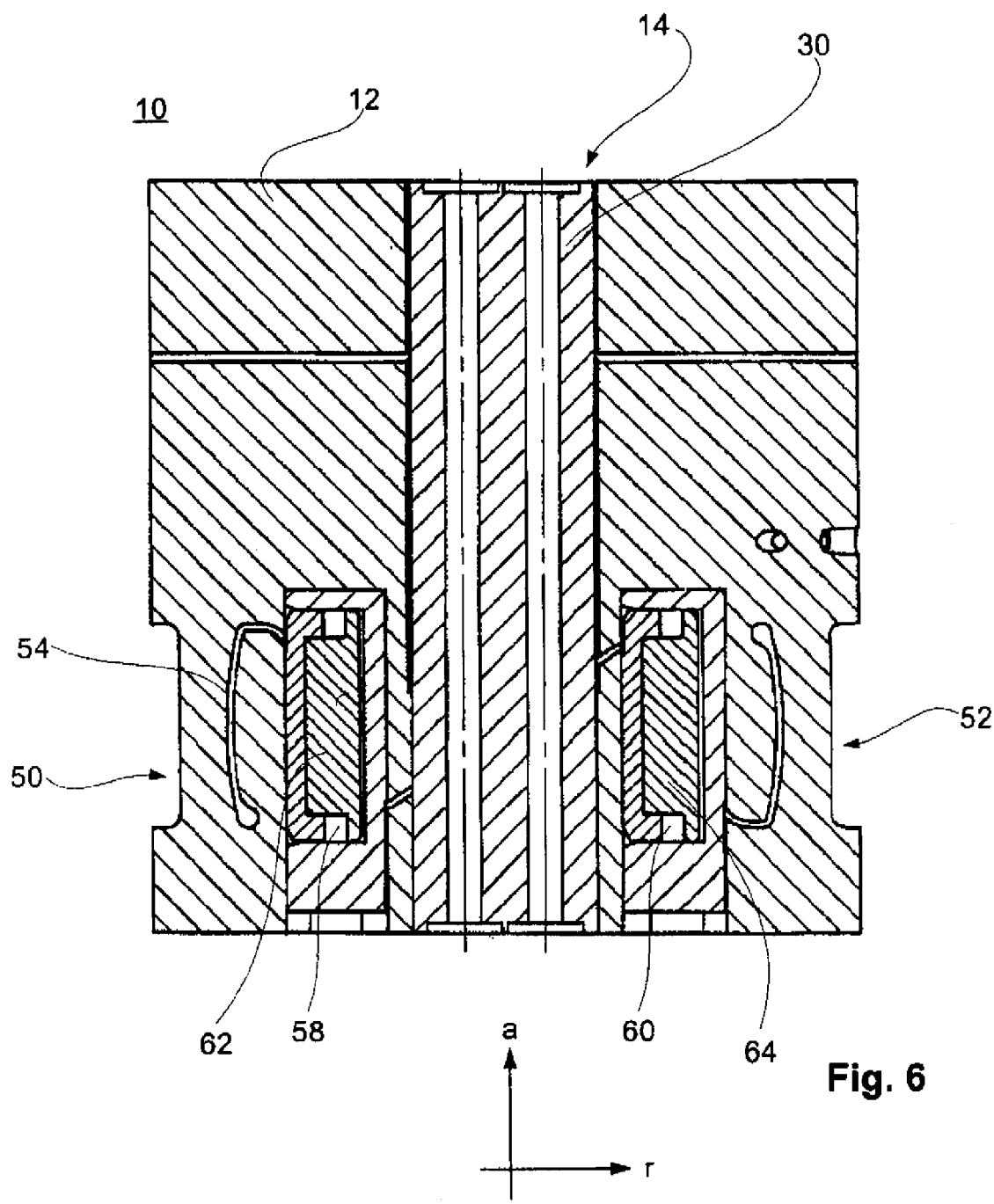
FIG. 6 is a sectional view of a third embodiment of a workholder according to the invention which can be finely adjusted in an axial direction as well as in two radial directions that are perpendicular to each other.

As may be gathered from FIG. 6, FIG. 7 and FIG. 8, the bottom portion of the annular body 12 of the third embodiment now has four additional weakened areas, i.e. two additional rectangular recesses 50, 52 and two additional double-S-shaped incisions 54, 56. The additional recesses 50, 52 and the additional double-S-shaped incisions 54, 56 are designed like the ones described above with regard to the second embodiment, however, axially spaced from, and rotated by 90° with respect to, them. Moreover, an additional pressure chamber 58, 60 each in the form of a recess and including a piston 62, 64 is assigned to the additional rectangular recesses 50, 52 in the manner already described above. These additional recesses 50, 52 in combination with the additional recesses 54, 56 again act like a spring which lends the actually rigid bottom portion of the annular body 12 a certain elasticity in a radial direction r, i.e. in the direction of the surface normal of the opposed additional recesses 50, 52.

This measure allows the workholder 10 of the third embodiment to be adjusted in a defined manner two radial directions that extend perpendicular to each other.

In addition, the third embodiment may be supplemented by adding the axially adjustable portion of the first embodiment so as to obtain a workholder which may be adjusted along three axes, i.e. in one axial direction and two radial directions that extend perpendicular to each other.

Figure 10:
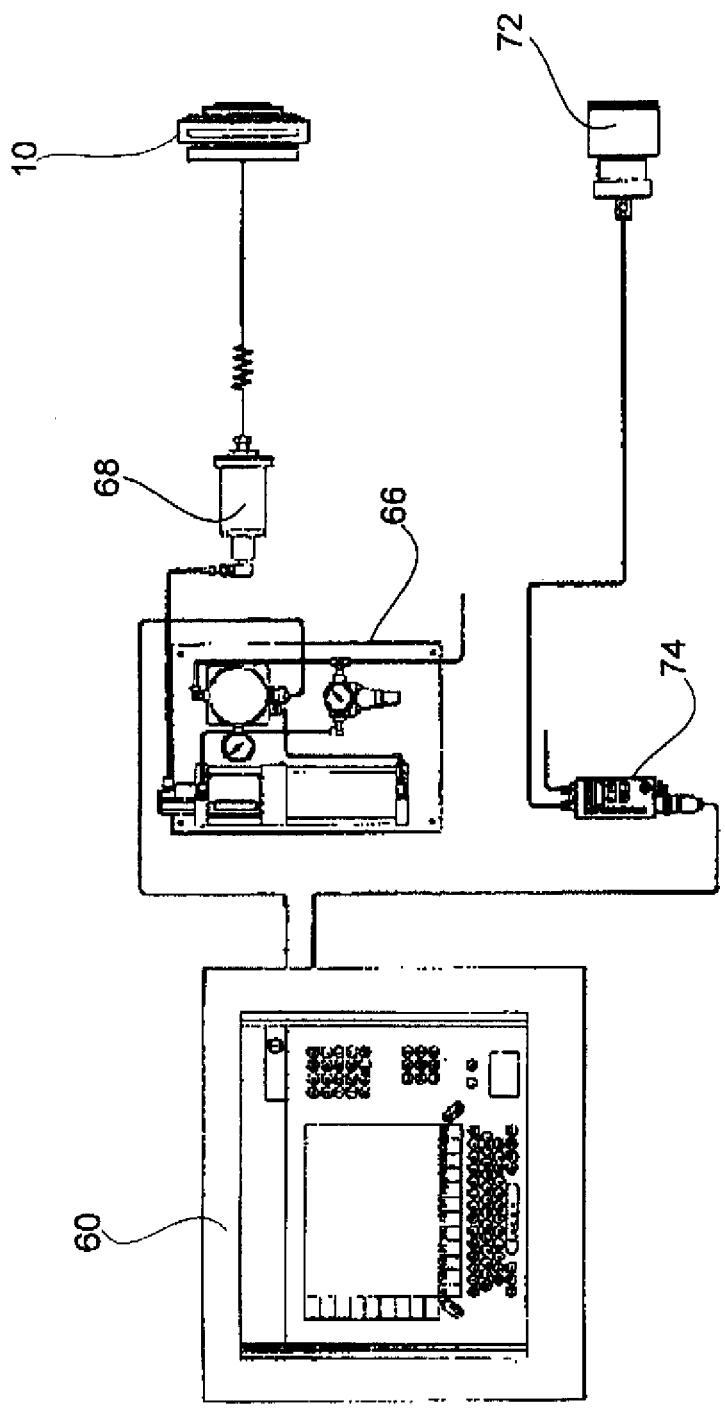
FIG. 10 is a schematic view of the structure of a workpiece correction system.

A schematic view of a workpiece correction system using the workholder 10 of the present invention is shown in FIG. 10.

The elastic area of said workholder 10 will be deformed in a specific and well-defined manner by the action of pressurized fluid. Such deformation will cause the workpiece held in said workholder 10 to be lifted axially—which allows manufacturing tolerances and the like to be compensated. The system is free of play and low-maintenance. The usual travel ranges are of the order of 0.1 to 0.2 mm, with a positioning accuracy in the micrometer range. As may be seen from FIG. 10, activation occurs by means of an I/P converter 66 which outputs a pneumatic control pressure of between 0 and 4 bar. This pressure will then be converted into an accordingly higher hydraulic pressure by means of a pneumatic-hydraulic pressure converter 68. As an alternative, activation may also occur via a hydraulic power unit and a servo valve.

The control signal for setting the control pressure and for adjusting the position of the workpiece comes from a measuring and control computer 70 which automatically calculates the correction based on the input data from a pneumatic plug gauge 72 and an I/P measuring transducer 74 and outputs the respective values for setting the control pressure.

Alternatively, the control signal for setting the control pressure and for adjusting the workpiece position may also be input into a control computer after manual measurements.

List of Reference Numeral

10 workholder
12 annular body
14 through hole
16 peripheral area of the annular body
18 weakened area/first recess
20 weakened area/second recess
22 pressure chamber/third recess
24 filling element
26 pressurized fluid channel
28 air vent screw
30 sleeve
32 screws
34 weakened area/rectangular recess
36 weakened area rectangular recess
38 weakened area/double-S-shaped incision
40 weakened area/double-S-shaped incision
42 pressure chamber/recess
44 pressure chamber/recess
46 piston
48 piston
50 weakened area/additional rectangular recess
52 weakened area/additional rectangular recess
54 weakened area/additional double-S-shaped incision
56 weakened area/additional double-S-shaped incision
58 additional pressure chamber recess
60 additional pressure chamber recess
62 piston
64 piston
66 I/P converter
68 pressure transducer
70 measuring and control computer
72 pneumatic measuring sensor
74 I/P measuring transducer
a axial direction
r radial direction This invention claimed is:

1. A workholder for holding a workpiece to be processed in a machine tool, said workholder comprises:
   an annular body having a central through hole;
   said annular body includes an interior and an outer peripheral surface;
   said annular body includes first and second weakened areas obtained by material removal in said outer peripheral surface of said annular body;
   a pressure chamber positioned between said first and second weakened areas obtained by material removal and said central through hole;
   said first weakened area includes a first circumferential recess extending therearound said annular body;
   said first circumferential recess extends radially inwardly toward said interior of said annular body;
   said second weakened area includes a second circumferential recess extending therearound said annular body;
   said second circumferential recess extends radially inwardly toward said interior of said annular body;
   said first circumferential recess and said second circumferential recess are spaced from each other in an axial direction;
   said pressure chamber as viewed in said axial direction is located between said first and said second circumferential recesses;
   said pressure chamber extends radially and circumferentially from said central through hole toward said outer peripheral surface, and, said pressure chamber being sealed; and,
   said first and second weakened areas obtained by material removal being dimensioned and disposed such that said annular body is elastically deformed in an axial direction or a radial direction or in an axial direction and a radial direction when said pressure chamber is charged with pressure.

2. The workholder as claimed in claim 1 wherein: said first and second circumferential recesses—as viewed in said radial direction—are of different radial depths.

3. The workholder as claimed in claim 1 wherein said pressure chamber is sealed by a filling element.

4. A workholder for holding a workpiece to be processed in a machine tool, said workholder comprises:
   an annular body having a central through hole;
   a sleeve mounted within said central through hole which is detachably connected to said annular body by fastening means;
   said annular body includes an interior and an outer peripheral surface;
   said annular body includes first and second weakened areas obtained by material removal in said outer peripheral surface of said annular body;
   a pressure chamber positioned between said first and second weakened areas obtained by material removal and said central through hole;
   said first weakened area includes a first circumferential recess extending therearound said annular body;
   said first circumferential recess extends radially inwardly toward said interior of said annular body;
   said second weakened area includes a second circumferential recess extending therearound said annular body;
   said second circumferential recess extends radially inwardly toward said interior of said annular body;
   said first circumferential recess and said second circumferential recess are spaced from each other in an axial direction;

said pressure chamber as viewed in said axial direction is located between said first and said second circumferential recesses;

said pressure chamber extends radially and circumferentially from said central through hole toward said outer peripheral surface, and, said pressure chamber being sealed; and, said first and second weakened areas obtained by material removal being dimensioned and disposed such that said annular body is elastically deformed in an axial direction or a radial direction or in an axial direction and a radial direction when said pressure chamber is charged with pressure.

5. The workholder as claimed in claim 4 wherein: said first and second circumferential recesses—as viewed in said radial direction—are of different radial depths.

6. The workholder as claimed in claim 4 wherein said pressure chamber is sealed by a filling element.

7. A workholder for holding a workpiece to be processed in a machine tool, said workholder comprises:

an annular body having a central through hole;

said annular body includes an interior and an outer peripheral surface;

first and second diametrically opposed rectangular recesses in said outer peripheral surface of said annular body;

first and second serpentine incisions in said outer peripheral surface of said annular body;

said first and second serpentine incisions in said outer peripheral surface are each located between said first and second diametrically opposed rectangular recesses in said outer peripheral surface;

a first pressure chamber located between said first rectangular recess in said outer peripheral surface and said central through hole, a first piston resides within said first pressure chamber, and, said first piston being displaced in a radial direction when said first pressure chamber is pressurized; and, a second pressure chamber located between said second rectangular recess in said outer peripheral surface and said central through hole; a second piston resides within said second pressure chamber, and, said second piston being displaced in a radial direction when said second pressure chamber is pressurized.

\* \* \* \* \*